(12) United States Patent
Ahmed et al.

(10) Patent No.: US 12,732,787 B2
(45) Date of Patent: Sep. 8, 2026

(54) METHOD AND SYSTEM FOR GATEWAY TYPE MONITORING EVENT SERVICE

(71) Applicant: Verizon Patent and Licensing Inc., Basking Ridge, NJ (US)

(72) Inventors: Riyaj Uddin Ahmed, Coppell, TX (US); Parry Cornell Booker, Sunnyvale, TX (US); Raghuram Parvataneni, Frisco, TX (US); David Taft, Keller, TX (US); Ye Huang, San Ramon, CA (US); Suzann Hua, Beverly Hills, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 283 days.

(21) Appl. No.: 18/495,218

(22) Filed: Oct. 26, 2023

(65) Prior Publication Data

US 2025/0142314 A1 May 1, 2025

(51) Int. Cl.

*H04W 8/00* (2009.01)
*H04L 67/141* (2022.01)
*H04W 8/18* (2009.01)
*H04W 88/16* (2009.01)

(52) U.S. Cl.

CPC .......... *H04W 8/005* (2013.01); *H04L 67/141* (2013.01); *H04W 8/18* (2013.01); *H04W 88/16* (2013.01)

(58) Field of Classification Search

CPC ....... H04W 8/005; H04W 8/18; H04W 88/16; H04L 67/141
USPC .... 455/414, 410, 419, 435.1, 406, 418, 224, 455/41.2, 408, 405
See application file for complete search history.

(56) References Cited

U.S. PATENT DOCUMENTS

2006/0135160 A1* 6/2006 Jiang .................. H04W 8/04 455/435.1
2006/0193474 A1* 8/2006 Fransdonk ........... H04L 63/061 380/279
2008/0109362 A1* 5/2008 Fransdonk .......... H04L 63/0823 705/51
2012/0315893 A1* 12/2012 Weppler ............. H04L 41/5022 455/424
2014/0105105 A1* 4/2014 Watanabe ............. H04W 4/38 370/328
2019/0281426 A1* 9/2019 Li ....................... H04M 15/64
2023/0353996 A1* 11/2023 Paczkowski ........... H04L 41/16
2024/0224214 A1* 7/2024 Paczkowski .......... H04W 60/04

* cited by examiner

*Primary Examiner* — Joseph Arevalo

(57) ABSTRACT

A method, a network device, a system, and a non-transitory computer-readable storage medium are described in relation to an gateway type monitoring event service. The gateway type monitoring event service may include providing a current gateway type associated with an end device and a network to an application function. The current gateway type may be used by the application function to perform a network operation or procedure.

20 Claims, 4 Drawing Sheets

METHOD AND SYSTEM FOR GATEWAY TYPE MONITORING EVENT SERVICE

BACKGROUND

Development and design of networks present certain challenges from a network-side perspective and an end device perspective. For example, Next Generation (NG) wireless networks, such as Fifth Generation New Radio (5G NR) networks are being deployed and are under development. End devices may connect to a radio access network (RAN) according to various types of configurations and may be afforded different quality of service (QOS) levels.

DETAILED DESCRIPTION

Figure 1:
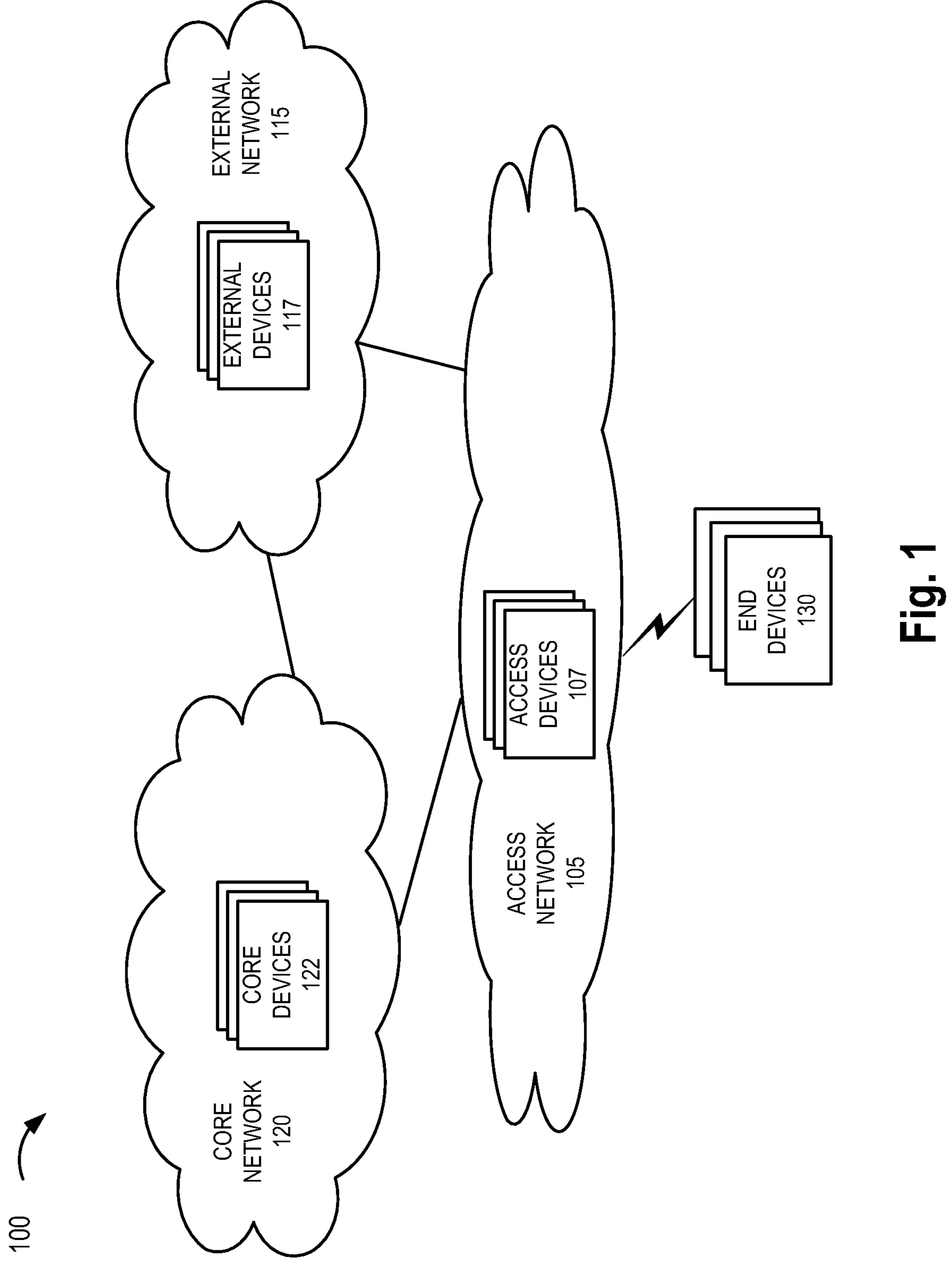
FIG. 1 is a diagram illustrating an exemplary environment in which an exemplary embodiment of a gateway type monitoring event service may be implemented.

The following detailed description refers to the accompanying drawings. The same reference numbers in different drawings may identify the same or similar elements. Also, the following detailed description does not limit the invention.

There are challenges for a network device, which may host an application service, such as an application server (AS), an application function (AF), or the like to obtain subscriber monitoring information. For example, the AF may query an enforcement function (EF), a service capability exposure function (SCEF), or the like to obtain the subscriber monitoring information. For different use cases associated with a non-standalone (NSA) scenario, the end device may be attached to a packet data network gateway (PGW) or a PGW-control plane (PGW-C) plus a session management function (SMF) (also referred to as PGW-C+SMF). However, the AF may be unable to obtain the current gateway type to which the end device is attached.

According to exemplary embodiments, a gateway type monitoring event service is described herein. The gateway type monitoring event service may be applied to a wireless environment. For example, the wireless environment may include a Fourth Generation (4G) wireless environment, a wireless local area network (WLAN), a 5G wireless environment, an evolved packet system (EPS)-5G core interworking network, a 4G core network, a 5G core network, and/or a future generation wireless environment, as described herein. According to an exemplary embodiment, the gateway type monitoring event service may include monitoring the gateway type used by the end device while connected to a network, as described herein. According to an exemplary implementation, the gateway type monitoring event service may be provided when the end device is connected in an NSA mode or to an NSA architecture. For example, as previously mentioned, the end device may be attached to a PGW or a PGW-C+SMF.

According to an exemplary embodiment, an exposure function, such as a SCEF or another type of network device may include logic of the gateway type monitoring event service, as described herein. According to an exemplary embodiment, the AF may request from the SCEF the gateway type associated with an end device and/or user (referred to simply as "end device"). According to an exemplary embodiment, in response to receiving the request, the SCEF may generate and transmit a query to a home subscriber server (HSS). According to an exemplary embodiment, the query may include data requesting whether the end device is subscribed to the gateway type monitoring event service and an end device identifier, as described herein.

According to an exemplary embodiment, the HSS may query its subscriber information of relevance to determine whether the end device is subscribed to the gateway type monitoring event service or not. According to various exemplary scenarios, the end device may be subscribed to the service or not. According to some exemplary scenarios, the end device may be subscribed to the service but the requesting AF does not have permission to access and use the current gateway type information. For example, the subscription information may indicate an AF or AFs that are permitted access to the current gateway type of the end device. As an example, a user or operator of the end device may grant permission to the AF or AFs to obtain the current gateway type information.

In response to the result of the query, the HSS may generate and transmit a response, which may include data indicating the end device is subscribed or not to the service. According to some embodiments, the response may also indicate a granting or denying of access to the gateway type information (e.g., in relation to the requesting AF) to the SCEF.

According to an exemplary embodiment, in response to receiving the response from the HSS, the SCEF may generate and transmit a response. For example, when the end device is not subscribed to the gateway type monitoring event service, the SCEF may generate and transmit a response, which may include data indicating that the current gateway type information is not available, to the AF. According to another example, when the end device is subscribed but the AF does not have permission to access this current gateway type information, the SCEF may generate and transmit a response, which may include data indicating that the current gateway type information is not permitted, a denial, or the like, to the AF.

According to yet another example, when the end device is subscribed or the end device is subscribed and the AF has permission to access the current gateway type information, the SCEF may generate and transmit a request for the gateway type of the end device, to a mobility management entity (MME) or similar network device that may provide mobility management (e.g., a mobility management device). In response to receiving the request, the MME may query information pertaining to the end device and determine the current gateway type. The MME may generate and transmit a response, which includes data indicating the gateway type (e.g., a PGW or a PGW-C+SMF) pertaining to the end device. In response to receiving the response, the SCEF may forward or generate and transmit a response that indicates the current gateway type of the end device.

According to various exemplary embodiments, the AF may use the current gateway type information for the initial provisioning of an application session with the end device or the maintenance of an existing application session with the end device. The AF may also use the current gateway type information as a mechanism relating to congestion, satisfying quality of service (QOS) metrics, and the like.

In view of the foregoing, the gateway type monitoring event service may improve the provisioning of subscriber monitoring events. The gateway type monitoring event service may further provide a mechanism to coordinate the AF with the end device and other intermediary networks, such as the RAN and/or the core network to offer and/or provide an application service, manage congestion, satisfy QoS metrics, and the like.

FIG. 1 is a diagram illustrating an exemplary environment 100 in which an exemplary embodiment of a gateway type monitoring event service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the gateway type monitoring event service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), GSM Association (GSMA), etc.) or a new interface of the network device may be provided in order to support the communication (e.g., transmission and reception of messages, information elements (IE), attribute value pairs (AVPs), etc.) between network devices and the gateway type monitoring event service logic of the network device, as described herein. According to various exemplary implementations, the interface of the network device may be a service-based interface, a reference point-based interface, an Open Radio Access Network (O-RAN) interface, or some other type of interface.

Access network 105 may include one or multiple networks of one or multiple types and technologies. For example, access network 105 may be implemented to include a 5G RAN, a future generation RAN (e.g., a Sixth Generation (6G) RAN, a Seventh Generation (7G) RAN, or a subsequent generation RAN), a centralized-RAN (C-RAN), an Open-RAN (O-RAN), and/or another type of access network. Access network 105 may include a legacy RAN (e.g., a Third Generation (3G) RAN, a 4G or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, a virtualized RAN (vRAN), a self-organizing network (SON), a wired network (e.g., optical, cable, etc.), or another type of network that provides access to or can be used as an on-ramp to access network 105.

Access network 105 may include different and multiple functional splitting, such as options 1, 2, 3, 4, 5, 6, 7, or 8 that relate to combinations of access network 105 and core network 120 including an Evolved Packet Core (EPC) network and/or an NG core (NGC) network, or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, NSA, standalone (SA), etc.), carrier aggregation (CA) (e.g., intra-band, inter-band, contiguous, non-contiguous, etc.), edge and core network slicing, coordinated multipoint (COMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of wireless architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, C-band, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an enhanced Long Term Evolution (eLTE) evolved Node B (eNB), an eNB, a radio network controller (RNC), a radio intelligent controller (RIC), a base station controller (BSC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), or another type of wireless node (e.g., a WiFi device, a WiMax device, a hotspot device, a fixed wireless access CPE (FWA CPE), etc.) that provides a wireless access service. Additionally, access devices 107 may include a wired and/or an optical device (e.g., modem, wired access point, optical access point, Ethernet device, multiplexer, etc.) that provides network access and/or transport service.

According to some exemplary implementations, access device 107 may include a combined functionality of multiple RATs (e.g., 4G and 5G functionality, 5G and 5.5G functionality, 5G and 6G), etc.) via soft and hard bonding based on demands and needs. According to some exemplary implementations, access device 107 may include a split access device (e.g., a CU-control plane (CP), a CU-user plane (UP), etc.) or an integrated functionality, such as a CU-CP and a CU-UP, or other integrations of split RAN nodes. Access device 107 may be an indoor device or an outdoor device.

External network 115 may include one or multiple networks of one or multiple types and technologies that provide an application service. For example, external network 115 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of application service layer network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), pods, network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, the application service may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, video calling, video conferencing, instant messaging), video streaming, fitness services, navigation services, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

According to an exemplary embodiment, at least some of external devices 117 may include logic of the gateway type monitoring event service. For example, an AF, an AS, a MEC server, an IP server, an Internet or Web server, or a similar network device that may host an application service (also referred to simply as an AF) may provide an exemplary embodiment of the gateway type monitoring event service, as described herein.

Core network 120 may include one or multiple networks of one or multiple network types and technologies. Core network 120 may include a complementary network of access network 105. For example, core network 120 may be implemented to include a 5G core network, an evolved packet core (EPC) of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a unified data management (UDM), a unified data repository (UDR), an authentication server function (AUSF), a security anchor function (SEAF), a network exposure function (NEF), a network slice selection function (NSSF), a network repository function (NRF), a policy control function (PCF), a network data analytics function (NWDAF), a SCEF, a lifecycle management (LCM) device, an MME, a PGW, an enhanced packet data gateway (ePDG), a serving gateway (SGW), a home agent (HA), a General Packet Radio Service (GPRS) support node (GGSN), an HSS, an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

According to an exemplary embodiment, at least some of core devices 122 may include logic of the gateway type monitoring event service. For example, a SCEF, a legacy EF, or another but similar type of network device may provide an exemplary embodiment of the gateway type monitoring event service, as described herein. According to an exemplary embodiment, an HSS, an HSS-front end (FE), an HSS database (DB), a legacy subscription storage device (e.g., a home location register (HLR), etc.), or another but similar type of network device may include logic of the gateway type monitoring event service. According to an exemplary embodiment, an MME or similar functioning network device may include logic of the gateway type monitoring event service.

End device 130 may include a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, headgear, a band, etc.), a computer, a gaming device, a television, a set top box, a music device, an IoT device, a drone, a smart device, a fixed wireless device, a router, a sensor, an automated guided vehicle (AGV), an industrial robot, or other type of wireless device (e.g., other type of user equipment (UE)). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device. End device 130 may be implemented as a virtualized device in whole or in part.

Figure 2:
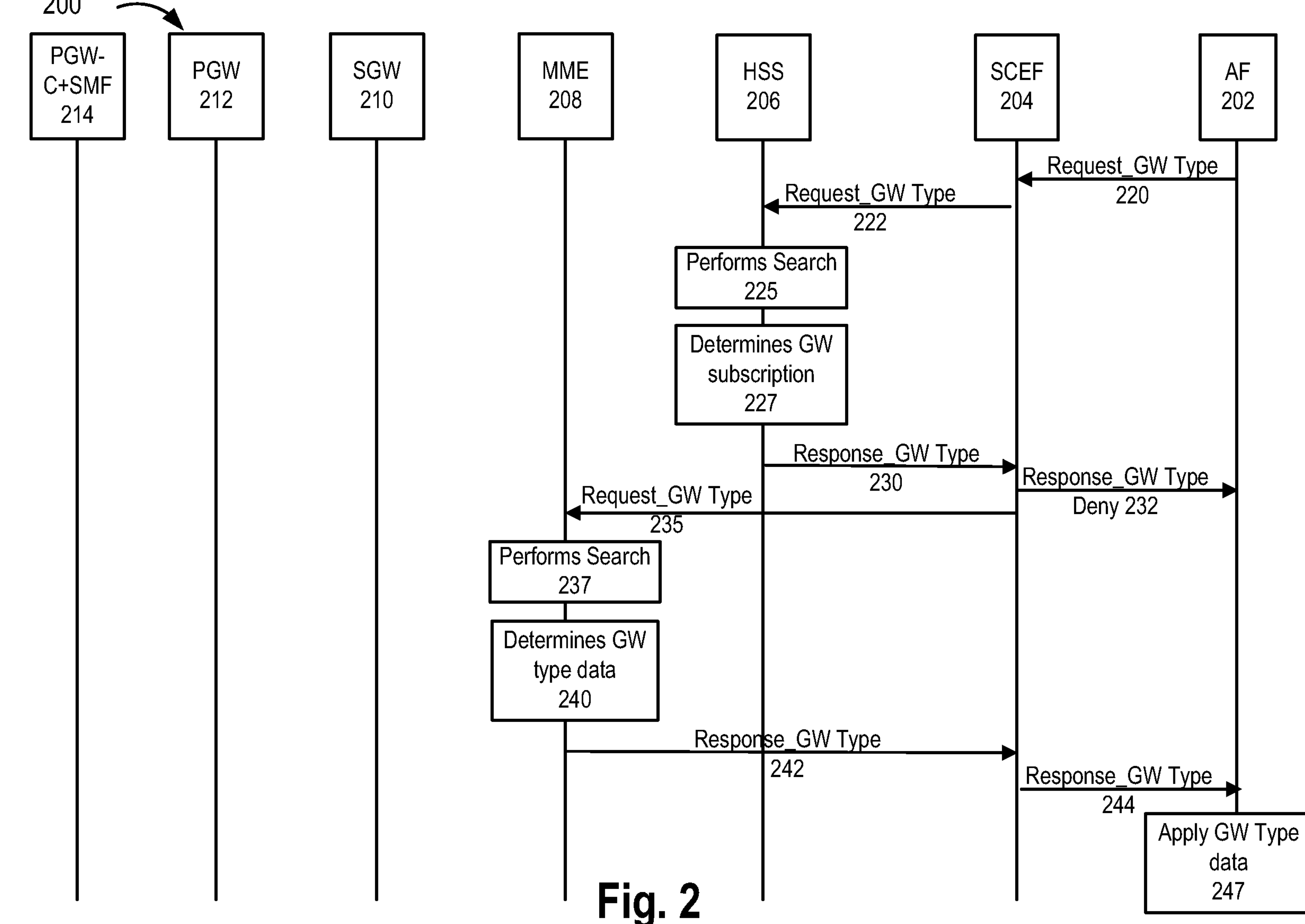
FIG. 2 is a diagram illustrating an exemplary process of an exemplary embodiment of the gateway type monitoring event service according to an exemplary scenario.

FIG. 2 is a diagram illustrating an exemplary process 200 of an exemplary embodiment of the gateway type monitoring event service. As illustrated, an exemplary environment may include an AF 202, a SCEF 204, an HSS 206, an MME 208, an SGW 210, a PGW 212, and a PGW-C+SMF 214. AF 202 is an exemplary implementation of external device 117. SCEF 204, HSS 206, MME 208, SGW 210, PGW 212, and PGW-C+SMF 214 are exemplary implementations of core devices 122. According to another exemplary environment, HSS 206 may be implemented according to a split architecture, such as an HSS FE and an HSS DB.

AF 202 may host an application service that may be used by end device 130. For example, the application service may be an application service described in relation to external device 117. According to various exemplary embodiments, AF 202 may be associated with a network operator or similar entity associated with access network 105, core network 120, and/or external network 115, or may be associated with a third party relative to the network operator or similar entity. SCEF 204, HSS 206, MME 208, SGW 210, PGW 212, and PGW-C+SMF 214 may each provide a function and/or a service in accordance with a network standard, such as 3GPP, 3GPP2, ITU, ETSI, GSMA, or the like and/or of a proprietary nature.

AF 202, SCEF 204 HSS 206, and MME 208 may each include a modified interface or a new interface that supports the communication of a message of the gateway type monitoring event service. According to an exemplary embodiment, AF 202, SCEF 204, HSS 206, and MME 208 may each include logic of an exemplary embodiment of the gateway type monitoring event service and/or provide support for a process of the gateway type monitoring event service, as described herein. For example, AF 202, SCEF 204, HSS 206, and MME 208 may each perform a function, an operation, and/or a service based on the message and/or the gateway type monitoring event service beyond a function and/or a service associated with the network standard. For example, AF 202, SCEF 204, HSS 206, and MME 208 may perform a function, an operation, or a service that includes identifying a current gateway type pertaining to end device 130 and providing the current gateway type to another network device or using the current gateway type for a network procedure or operation, as described herein.

Although FIG. 2 does not depict messaging from SGW 210, PGW 212, and PGW-C+SMF 214 in relation to process 200, during a connection establishment or attachment procedure, messages may be exchanged that are not depicted. According to this example, PGW 212 and PGW-C+SMF 214 are exemplary gateway types associated with the gateway type monitoring event service. For a given connection, end device 130 may be connected to PGW 212 or PGW-C+SMF 214. Although not illustrated, according to an exemplary environment of process 200, SGW 210 may connect to PGW 212 and PGW-C+SMF 214. SGW 210 may also connect to MME 208. MME 208 may obtain and store connectivity information of end device 130, which may include the gateway type, from SGW 210. For example, as part of a create session procedure, MME 208 may obtain and store the gateway type information, as described herein.

Referring to FIG. 2, AF 202 may generate and transmit a request gateway (GW) type message 220 to SCEF 204. According to various exemplary scenarios, AF 202 may generate and/or transmit message 220 before an application service session is established with end device 130, as a part of an establishment of an application service session with end device 130, or during an active application service session with end device 130. The request gateway type message 220 may include data requesting current gateway type information access, permission, or use and an identifier of end device 130 (e.g., an international mobile subscriber identity (IMSI) or another unique identifier that identifies end device 130). According to some exemplary embodiments, the request gateway type message 220 may be implemented as a packet data network (PDN) connectivity status message or query. According to some exemplary implementations, the request gateway type message 220 may include a unique identifier of AF 202, an application name, or the like that may be used for determining access to the current gateway type information by the AF 202. For example, the unique identifier of AF 202 may be implemented as an identifier other than a network address.

In response to receiving and reading request gateway type message 220, SCEF 204 may forward request gateway type message 220 or generate and transmit a request gateway type message 222, which may include data requesting a current gateway type and an identifier of end device 130, to HSS 206. In response to receiving and reading request gateway type message 220 or 222, HSS 206 may perform a search 225 in subscription information. According to this example, based on the result of the search, HSS 206 may identify or determine whether end device 130 is subscribed to the gateway type monitoring event service or not 227. As an example, subscription information of end device 130 may indicate whether end device 130 is subscribed to or not regarding gateway type event monitoring. According to some exemplary implementations, the subscription information may include permission information that indicates AF(s) that have permission to the current gateway type information. As further illustrated, HSS 206 may generate and transmit a response gateway type message 230 to SCEF 204. According to some exemplary embodiments, response gateway type message 230 may be implemented as a positive acknowledgement or a negative acknowledgement.

In response to receiving and reading response gateway type message 230, SCEF 204 may generate and transmit a response gateway type deny message 232 when response gateway type message 230 indicates that end device 130 is not subscribed to the gateway type monitoring event service or AF 202 does not have permission to access the current gateway type. Alternatively, SCEF 204 may generate and transmit a request gateway type message 235 to MME 208 when response gateway type message 230 indicates that end device 130 is subscribed to the gateway type monitoring event service or that end device 130 is subscribed and AF 202 has permission. The request gateway type message 235 may include data requesting current gateway type information and an identifier of end device 130 (e.g., an international mobile subscriber identity (IMSI) or another unique identifier that identifies end device 130). In response to receiving and reading request gateway type message 235, MME 208 may perform a search 237 of context information or similar type of connectivity information relating to end device 130. Based on the result of the search, MME 208 may identify or determine current gateway type data 240 (or the absence thereof when end device 130 may not be connected to the network). As an example, the gateway type data 340 may indicate that the current gateway type of end device 130 is a PGW (e.g., PGW 212) or a PGW-C+SMF (e.g., PGW-C+SMF 214), as described herein. Alternatively, the gateway type data 240 may indicate that end device 130 is not connected to the network (e.g., absent).

In response to receiving and reading response gateway type message 242, SCEF 204 may forward response gateway type message 242 to AF 202 or generate and transmit a response gateway type message 244 to AF 202. Response gateway type message 242/244 may indicate one of the current PGW, the PGW-C+SMF, or a null value or the like (e.g., end device 130 not connected, etc.). In response to receiving and reading message 230 or 232, AF 202 may apply the gateway type data 247 to an operation or network procedure. For example, AF 202 may use the gateway type data 247 to establish an application session with end device 130 in view of the gateway type (e.g., PGW or PGW-C+SMF) and/or to communicate with core device 122 of a 4G core network (e.g., a PCRF, etc.) to obtain policy information applicable to end device 130. According to another example, during an active application session, AF 202 may use the gateway type data 247 to modify or maintain a QoS metric or a QoS Class identifier (QCI) value associated with an application session. According to yet another example, when the gateway type data 247 indicates that end device 130 is absent or not connected to a network (e.g., a core network), AF 202 may trigger a timer and wait a period of time before initiating another gateway type request and/or may store gateway type data as historical information pertaining to end device 130 and its associated availability, connectivity to a network, NSA usage, and the like.

FIG. 2 illustrates an exemplary process 200 of the gateway type monitoring event service, however, according to other exemplary embodiments, the gateway type monitoring event service may perform additional operations, fewer operations, and/or different operations than those illustrated and described in relation to FIG. 2. For example, in response to receiving request gateway type message 222, an HSS-FE (not illustrated) may query an HSS DB (also not illustrated) for subscription information pertaining to end device 130 and the gateway type monitoring event service, and based on a result of the query, the HSS-FE may generate and transmit response gateway type message 230 to SCEF 204.

Figure 3:
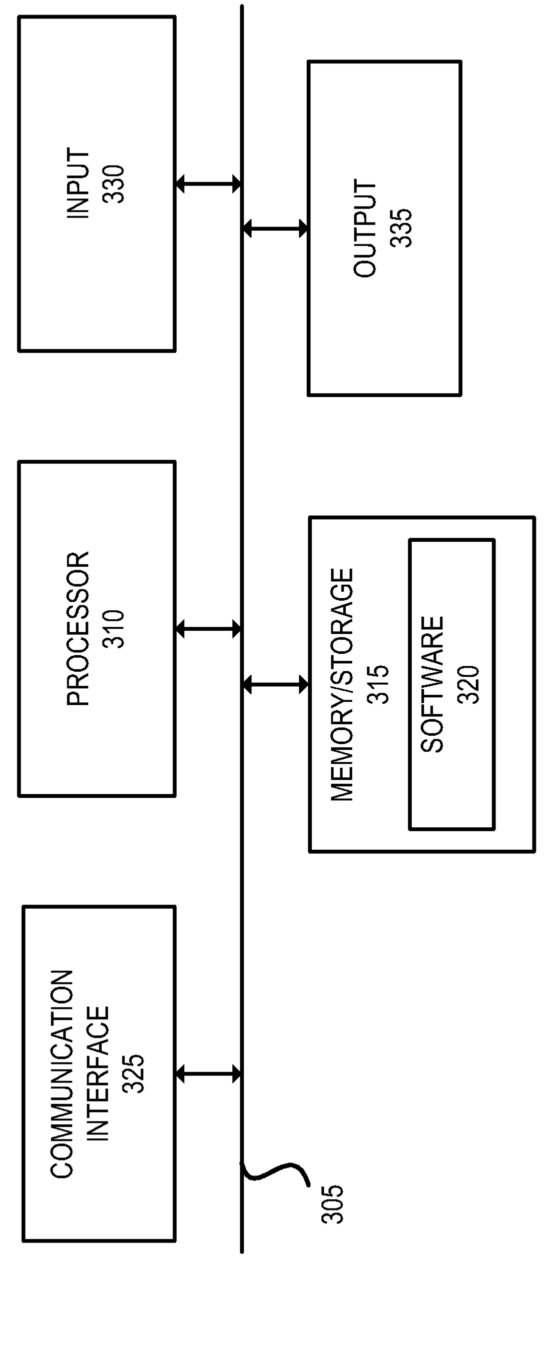
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to access device 107, external device 117, core device 122, end device 130, and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium. Memory/storage 315 may store data, software, and/or instructions related to the operation of device 300.

Software 320 includes an application or a program that provides a function and/or a process. As an example, with reference to core device 122 (e.g., AF 202, SCEF 204, HSS 206, MME 208, SGW 210, etc.), software 320 may include an application that, when executed by processor 310, provides a function and/or a process of the gateway type monitoring event service, as described herein. Software 320 may also include firmware, middleware, microcode, hardware description language (HDL), and/or another form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces, optical interfaces, and/or wired interfaces. For example, communication interface 325 may include one or multiple transmitters and receivers, or transceivers. Communication interface 325 may operate according to a protocol stack and a communication standard. Communication interface 325 may support one or multiple MIMO, beamforming, and/or transmission/reception configurations.

Input 330 permits an input into device 300. For example, input 330 may include a keyboard, a mouse, a display, a touchscreen, a touchless screen, a button, a switch, an input port, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life-cycle (e.g., refreshed, paused, suspended, rebooted, or another type of state or status), using well-known virtualization technologies. For example, access device 107, core device 122, external device 117, and/or another type of network device or end device 130, as described herein, may be a virtualized device.

Device 300 may be configured to perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function, an operation, or a process described herein. Alternatively, for example, according to other implementations, device 300 may be configured to perform a function, an operation, or a process described herein based on the execution of hardware (processor 310, etc.).

Figure 4:
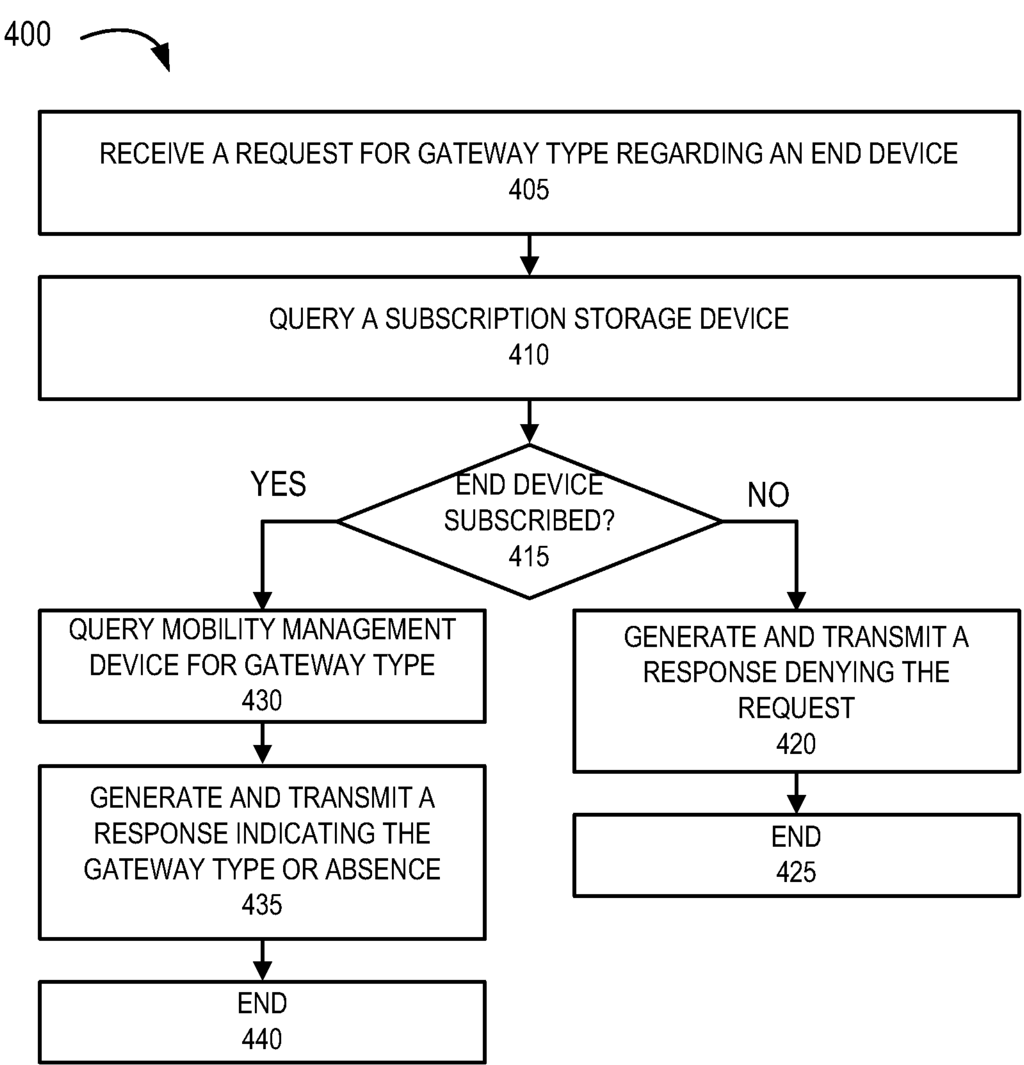
FIG. 4 is a diagram illustrating an exemplary process of an exemplary embodiment of the gateway type monitoring event service.

FIG. 4 is a flow diagram illustrating an exemplary process 400 of an exemplary embodiment of the gateway type monitoring event service. According to an exemplary embodiment, core devices 122 may perform operations of process 400. For example, a network device or an enforcement function, such as SCEF 204 may perform operations or steps of process 400. According to an exemplary implementation, processor 310 executes software 320 to perform a step (in whole or in part) of process 400, as described herein. Alternatively, a step (in whole or in part) may be performed by execution of only hardware. For purposes of description only, operations of process 400 are described as being performed by a SCEF, such as SCEF 204. Process 400 may include an operation illustrated and described in relation to FIG. 2 and elsewhere in this description.

Referring to FIG. 4, in block 405, SCEF 204 may receive a request for a gateway type regarding end device 130. For example, AF 202 may transmit the request to SCEF 204. The request may include an end device identifier associated with end device 130. The request may also include a unique identifier of AF 202 for permissions purposes, as described herein.

In block 410, SCEF 204 may query a subscription storage device. For example, SCEF 204 may query HSS 206 (or an HSS FE) for subscription information of end device 130 in relation to the gateway type monitoring event service. The query or request may include the end device identifier and data requesting whether end device 130 is subscribed to the gateway type monitoring event service. The query or request may also include the unique identifier of AF 202.

In block 415, SCEF 204 may determine whether the end device is subscribed. For example, based on a result of the query or receipt of a response from HSS 206, SCEF 204 may determine whether end device 130 is subscribed to the gateway type monitoring event service. According to some exemplary implementations, SCEF 204 may also determine whether AF 202 has permission to access the current gateway type information.

In block 415-NO, when SCEF 204 determines that end device 130 is not subscribed to the gateway type monitoring event service, SCEF 204 may generate and transmit a response denying the request to AF 202. Alternatively, SCEF 204 may perform a similar operation when end device 130 is subscribed but AF 202 does not have permission to access the current gateway type information. In block 425, process 400 may end.

In block 415-YES, when SCEF 204 determines that end device 130 is subscribed to the gateway type monitoring event service, in block 430, SCEF 204 may query MME 208 for current gateway type information. Alternatively, SCEF 204 may perform a similar operation when end device 130 is subscribed and AF 202 has permission to access the current gateway type information.

In block 435, as a result of the query or receipt of a response from MME 208, SCEF 204 may generate and transmit a response indicating the gateway type or absence of end device 130, to AF 202. For example, the response may indicate the current gateway type associated with end device 130 as PGW 212 or PGW-C+SMF 214. Alternatively, the response may indicate that end device 130 is not connected to the network. In block 440, process 400 may end.

FIG. 4 illustrates an exemplary process 400 of the gateway type monitoring event service, however, according to other exemplary embodiments, the gateway type monitoring event service may perform additional operations, fewer operations, and/or different operations than those illustrated and described in relation to FIG. 4. For example, according to other exemplary embodiments, SCEF 204 may not query HSS 206. For example, in response to receiving the request from AF 202, SCEF 204 may query MME 208 and provide the response to AF 202.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the process illustrated in FIG. 4, the order of the blocks may be modified according to other embodiments. Further, non-dependent blocks may be performed in parallel. Additionally, other processes (e.g., FIG. 2) described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:

receiving, by one or more network devices from a first network device, a request for a current gateway type associated with an end device;

querying, by the one or more network devices a subscription storage device in response to the receiving, subscription information pertaining to the end device and a gateway type monitoring event service;

determining, by the one or more network devices based on the querying, that the end device is subscribed to the gateway type monitoring event service;

querying, by the one or more network devices in response to the determining, a mobility management device, for the current gateway type; and transmitting, by the one or more network devices to the first network device, a first response that includes current gateway type data indicating the current gateway type.

2. The method of claim 1, wherein the one or more network devices include a service capability exposure function.

3. The method of claim 1, further comprising:

applying the current gateway type data of the end device to a network operation or procedure.

4. The method of claim 3, wherein the network operation pertains to an establishment of a first application session between the first network device and the end device, or a modification of an active second application session between the first network device and the end device.

5. The method of claim 1, wherein the current gateway type data indicates a packet data network gateway (PGW), a PGW-control plane (PGW-C) plus a session management function (SMF), or that the end device is not connected.

6. The method of claim 1, further comprising:

determining, by the one or more network devices based on the querying of the subscription storage device, that the first network device has permission to access the current gateway type.

7. The method of claim 1, wherein the request includes a unique identifier of the end device and a unique identifier of the first network device pertaining to the gateway type monitoring event service.

8. The method of claim 1, wherein the first network device includes an application function (AF) that hosts an application service external from a core network of the one or more network devices.

9. A system comprising:

one or more network devices, wherein the one or more network devices comprise one or more first processors configured to:

receive, from a first network device, a request for a current gateway type associated with an end device;

query, a subscription storage device in response to the receiving, subscription information pertaining to the end device and a gateway type monitoring event service;

determine, based on a result of the query, that the end device is subscribed to the gateway type monitoring event service;

query, in response to the determining, a mobility management device, for the current gateway type; and transmit to the first network device, a first response that includes current gateway type data indicating the current gateway type.

10. The system of claim 9, further comprising:

the first network device, wherein the first network device comprises a second processor configured to:

apply the current gateway type data of the end device to a network operation or procedure.

11. The system of claim 10, wherein the network operation pertains to an establishment of a first application session between the first network device and the end device, or a modification of an active second application session between the first network device and the end device.

12. The system of claim 9, wherein the one or more network devices include a service capability exposure function.

13. The system of claim 9, wherein the current gateway type data indicates a packet data network gateway (PGW), a PGW-control plane (PGW-C) plus a session management function (SMF), or that the end device is not connected.

14. The system of claim 9, wherein the one or more first processors are further configured to:

determine, based on the query of the subscription storage device, that the first network device has permission to access the current gateway type.

15. The system of claim 9, wherein the request includes a unique identifier of the end device and a unique identifier of the first network device pertaining to the gateway type monitoring event service.

16. The system of claim 9, wherein the first network device includes an application function (AF) that hosts an application service external from a core network of the network device.

17. A non-transitory computer-readable storage medium storing instructions executable by one or more processors of one or more network devices, wherein the instructions are configured to:

receive, from a first network device, a request for a current gateway type associated with an end device;

query, a subscription storage device in response to the receiving, subscription information pertaining to the end device and a gateway type monitoring event service;

determine, based on a result of the query, that the end device is subscribed to the gateway type monitoring event service;

query, in response to the determining, a mobility management device, for the current gateway type; and transmit to the first network device, a first response that includes current gateway type data indicating the current gateway type.

18. The non-transitory computer-readable storage medium of claim 17, wherein the instructions are further configured to:

determine, based on the query of the subscription storage device, that the first network device has permission to access the current gateway type.

19. The non-transitory computer-readable storage medium of claim 17, wherein the request includes a unique identifier of the end device and a unique identifier of the first network device pertaining to the gateway type monitoring event service.

20. The non-transitory computer-readable storage medium of claim 17, wherein the current gateway type data indicates a packet data network gateway (PGW), a PGW control plane (PGW-C) plus a session management function (SMF), or that the end device is not connected.

* * * * *